Figure 1:
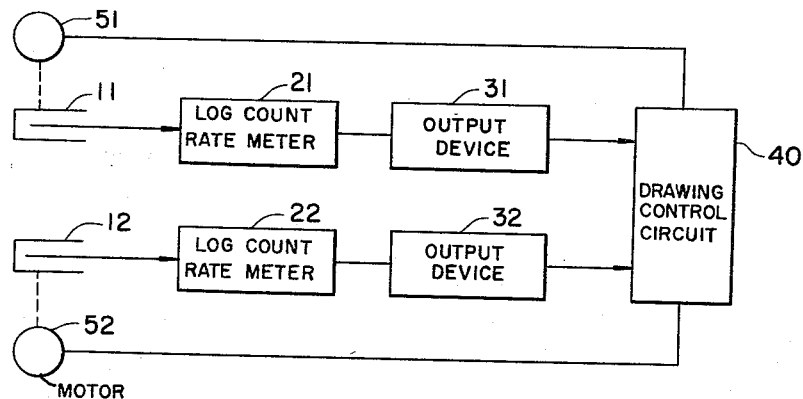

June 6, 1967  TOSHIO NAKAGAWA  3,324,293
COUNTING TUBE AUTOMATIC DRAWING DEVICE IN A NUCLEAR
REACTOR CONTROL SYSTEM
Filed Sept. 6, 1963

INVENTOR.
TOSHIO NAKAGAWA
BY Arthur H. Swanson

United States Patent Office 3,324,293
Patented June 6, 1967

3,324,293
COUNTING TUBE AUTOMATIC DRAWING DEVICE IN A NUCLEAR REACTOR CONTROL SYSTEM
Toshio Nakagawa, Yokohama, Japan, assignor to Honeywell Inc., a corporation of Delaware
Filed Sept. 6, 1963, Ser. No. 307,216
Claims priority, application Japan, Sept. 10, 1962, 37/38,477
1 Claim. (Cl. 250—83.6)

The present invention relates to a counting tube automatic drawing device for use in the measurement of neutron flux density of a nuclear reactor.

In general, when a nuclear reactor is started, an instrument measurement of neutron flux density is carried out from a low output level by using a measuring system including a counting tube such as a nuclear fission counting tube, a $BF_3$ comparison counting tube, etc. with a log count rate meter.

Since the output variation range of a nuclear reactor is very large, it is impossible to cover said output variation range by an ordinary log count rate meter, and therefore it is often the practice to widen the measuring range by moving or drawing the counting tube away from the center of the reactor periodically by a driving device and using a relationship of distance v. attenuation calculated in advance.

However, since, when the moving or drawing of a counting tube is being carried out, the measurement of the count rate becomes impossible, two count rate measuring systems have been established in the past. Further, a signalling or warning contact of a current meter or a graphic meter is added to each of said two systems and the drawing of the counting tubes is carried out automatically and alternately.

However, according to this method, due to differences in the neutron flux density, differences of counting tube sensitivities, errors in setting of warning contacts, etc. with respect to each system, the operation levels of said two systems gradually approach each other, resulting in the defect that eventually drawings of both counting tubes are carried out at the same time.

The present invention relates to a counting tube automatic drawing device by which said defect is eliminated by assuring that both counting tubes are never being drawn at the same time.

Figure 2:
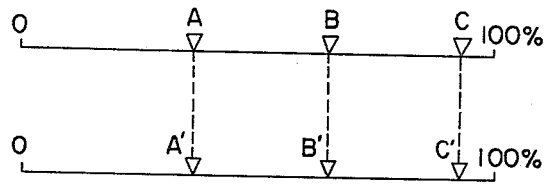
Figure 3:
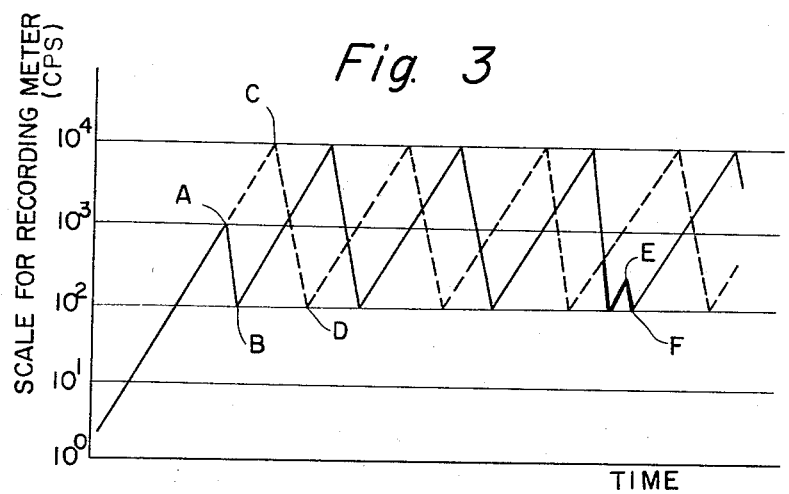

The object and advantage of this invention will become readily apparent from the following detailed description, in which:

FIG. 1 is a block diagram of a counting tube automatic drawing device in accordance with the present invention, FIG. 2 is a view showing one example of scales and warning points of recording meters, or indicators to be used in a counting tube automatic drawing device according to FIG. 1, and FIG. 3 is a view showing one recording example of said recording meters.

FIG. 1 shows a block diagram of apparatus according to the present invention, and said apparatus consists of the first measuring system in which a counting tube 11 is connected through a log count rate meter 21 with an output device such as a recording meter or an indicator 31, the second measuring system in which a counting tube 12 is connected through a log count rate meter 22 with an output device such as a recording meter or an indicator 32, and a drawing control circuit 40 which transmits drawing signals or stop signals to a driving motor 51 which performs a drawing of the counting tube 11 and a driving motor 52 which performs a drawing of the counting tube 12 in response to warning signals from the recording meters or indicators 31 or 32.

FIG. 2 is one example of scales and signalling or warning points of the warning contacts of the recording meters or indicators used in a counting tube automatic drawing device in accordance with the present invention. The upper scale of FIG. 2 is that of the meter 31, while the lower scale is that of the meter 32. Warning points at the lower-limit, middle and upper-limit of the first measuring system are named A, B and C, respectively, and warning points at the lower-limit, middle and upper-limit of the second measuring system are named A', B' and C', respectively. These warning points are established so that $A=A'$, $B=B'$ and $C=C'$, and B is established at the middle of A and C. The drawing control circuit 40 is designed to have the following function:

(1) When the needles of the recording meters or the indicators 31 and 32 reach the upper-limit warning points C and C', drawing signals are transmitted to each of driving motors 51 and 52.

(2) When the needles of the recording meters or the indicators 31 and 32 reach the lower-limit warning points A and A', stop signals are transmitted to each of driving motors 51 and 52.

(3) In case the needle of the recording meter or the indicator 31 reaches the middle warning point B while the needle of the recording meter or the indicator 32 is between the warning points A' and B', a drawing signal is transmitted to the driving motor 52.

(4) When the needles of the recording meters or the indicators 31 and 32 reach the middle warning points B and B' at the same time, a drawing signal is always transmitted to the driving motor 52 by a priority order decision circuit included in the circuit 40.

(5) When the drawing operation is being carried out, no signal is transmitted should the needle of its measuring system reach the middle warning point.

(6) In case the needle of the recording meter or the indicator 32 does not reach the lower-limit warning point A' by the time that the needle of the recording meter or the indicator 31 reaches the upper-limit warning point C, that is, when the drawing of the counting tube 12 is still being carried out, a safety signal is transmitted to a protection safety system of the nuclear reactor.

Though the present invention is constructed as mentioned above, we will explain the operation of the automatic drawing device in accordance with this invention by using one example of the records in FIG. 3.

Since the output of a nuclear reactor usually increases exponentially, the scale of the recording meter was made logarithmic, and, for the sake of convenience of explanation, the records of the recording meters 31 and 32 were recorded on the same chart, the records of the recording meter 31 being shown by dotted lines and the records of the recording meter 32 by full lines.

Each of the counting tubes 11 and 12 is initially inserted near the center of the nuclear reactor. When the nuclear reactor is started, its output begins to increase, and the needles of the recording meters are raised thereby and reach the middle warning point of 1,000 cps. at the same time. Therefore, the priority order decision circuit of the drawing control circuit 40 is actuated, and the drawing of the counting tube 12 (between A and B in FIG. 3) is started and continues until the needle of the recording meter 32 reaches the lower warning point of 100 cps. A measurement of the output of counting tube 11 is continued as it is without the counting tube 11 being drawn, and when the needle of the recording meter 31 reaches the upper-limit warning point of 10,000 cps., the drawing of the counting tube 11 begins (between C and D in FIG. 3). When the needle of meter 31 reaches the lower-limit warning point of 100 cps., the drawing of tube 11 is stopped. Thereafter, the measurement is continued by the tube which is not then being moved, and when the corresponding needle reaches its upper-limit warning point of 10,000 cps., the drawing of that counting tube is carried out.

In case the needle of the recording meter 31 reaches the middle warning point of 1,000 cps. while the needle of the recording meter 32 is between the lower-limit and the middle warning point, the drawing of the counting tube 12 (between E and F in FIG. 3) is carried out.

As seen from the example as shown in FIG. 3, the counting tube automatic drawing device in accordance with this invention does never draw the two counting tubes at the same time, and the measurement of the neutron flux density of a nuclear reactor can thus be carried out entirely continuously.

Further, the counting tube automatic drawing device in accordance with the present invention easily detects an abnormal output of a nuclear reactor, immediately transmits signals to a nuclear reactor control system, and maintains the protection and safety of the nuclear reactor.

While a preferred embodiment of the present invention is disclosed, it is recognized that the scope of the present invention is not limited thereto and it is therefore intended that the scope of the present invention be defined by the scope of the appended claim.

What is claimed is:

A counting tube automatic drawing device including
    a first measuring system including
        a first counting tube,
        a first log count rate meter actuated by the output of said first counting tube,
        a first output device actuated by the output of said first log count rate meter and having a cooperating pointer and lower-limit, middle, and upper-limit warning points, and
        a first motor for drawing said first tube,
    a second measuring system including
        a second counting tube,
        a second log count rate meter actuated by the output of said second counting tube,
        a second output device actuated by the output of said second log count rate meter and having a cooperating pointer and lower-limit, middle, and upper-limit warning points, and
        a second motor for drawing said second tube,
    a drawing control circuit for controlling said motors in response to the relationship between each of said pointers and the corresponding ones of said cooperating warning points, said circuit applying a drawing signal to the corresponding one of said motors upon said pointer of the corresponding one of said output devices reaching the corresponding one of said upper-limit warning points, thereby to cause the corresponding one of said tubes to be moved in a direction to reduce its output, said circuit also applying a stop signal to the corresponding one of said motors upon said pointer of the corresponding one of said output devices reaching the corresponding one of said lower-limit warning points, thereby to cause said movement of the corresponding one of said tubes to be arrested, said circuit also applying a drawing signal to said second motor upon said pointer of said first output device reaching the corresponding one of said middle warning points while said pointer of said second output device lies between the corresponding lower-limit and middle warning points, and
    a priority order decision circuit included in said drawing control circuit for causing the latter to apply a drawing signal to a predetermined one of said motors upon both of said pointers reaching the corresponding ones of said middle warning points at substantially the same time.

References Cited
UNITED STATES PATENTS

| | | | |
|---|---|---|---|
| 2,769,098 | 10/1956 | Dunham | 250—83.6 |
| 2,984,746 | 5/1961 | Speh et al. | 250—83.6 X |
| 3,084,254 | 4/1963 | Goupil | 250—83.6 |

RALPH G. NILSON, *Primary Examiner.*

S. ELBAUM, *Assistant Examiner.*